US008732264B2

United States Patent
Decker et al.

(10) Patent No.: US 8,732,264 B2
(45) Date of Patent: May 20, 2014

(54) HIPERSOCKETS SIGA LIGHT-SENDING WITHOUT OUTBOUND QUEUE

(75) Inventors: Dietmar Friedrich Decker, Boeblingen (DE); Waleri Fomin, Boeblingen (DE); Andreas Gerstmeier, Boeblingen (DE); Stefan Reimbold, Boeblingen (DE); Alexandra Winter, Boebingen (DE)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 12/956,239

(22) Filed: Nov. 30, 2010

(65) Prior Publication Data

US 2011/0153772 A1 Jun. 23, 2011

(30) Foreign Application Priority Data

Dec. 17, 2009 (EP) ..................................... 09179759

(51) Int. Cl.
*G06F 15/167* (2006.01)
*G06F 15/16* (2006.01)

(52) U.S. Cl.
USPC ............................ 709/215; 709/214; 709/202

(58) Field of Classification Search
USPC ....................................................... 709/215
See application file for complete search history.

(56) References Cited

U.S. PATENT DOCUMENTS

| 6,332,171 | B1 * | 12/2001 | Baskey et al. | ................... 710/39 |
|---|---|---|---|---|
| 6,854,021 | B1 | 2/2005 | Schmidt et al. | |
| 7,660,957 | B2 * | 2/2010 | Hirakawa et al. | ............. 711/162 |
| 8,041,902 | B2 * | 10/2011 | Stevens et al. | ................ 711/154 |
| 2009/0182927 | A1 * | 7/2009 | Stevens et al. | .................... 711/1 |

OTHER PUBLICATIONS

M. E. Baskey et al "zSeries Features for Optimized Sockets-Based Messaging: HiperSockets and OSA-Express", IBM Journal of Research and Development, vol. 46, No. 4/5, Jul./Sep. 2002, pp. 475-485.

* cited by examiner

*Primary Examiner* — Faruk Hamza
*Assistant Examiner* — Abu-Sayeed Haque
(74) *Attorney, Agent, or Firm* — Steven Chiu

(57) ABSTRACT

Performing logical partition (LPAR)-to-LPAR communication in a network computing environment. Read or write requests to different memory areas of a single computer memory are controlled by a storage control element, where the requests are issued by different multiple operating systems using a general network transfer format. A request is sent by a first operating system to said storage control element, where the request is executed with a processor instruction. A result of the request is received by the same or a second operating system. A modified processor instruction is sent to the storage control element, which implements an execution of the instruction synchronously performed to the sending of the instruction, without buffering the request of the instruction in a dedicated queue.

14 Claims, 8 Drawing Sheets

HIPERSOCKETS SIGA LIGHT-SENDING WITHOUT OUTBOUND QUEUE

CROSS REFERENCE TO RELATED APPLICATIONS

This application claims priority under 35 U.S.C. §119 from European Patent Application No. 09179759.7 filed Dec. 17, 2009, the entire contents of which are incorporated herein by reference

BACKGROUND

The present invention relates to communication between processes in a multiprocessor system, and more particularly relates to communications between partitions within a logically partitioned computer referred to as LPAR-to-LPAR communication.

In recent years the capacity of mainframe class servers has grown, and the quantity of data they are required to handle has grown with them. As a result, the existing prior art IBM System Z™ I/O architecture required modifications to support an order of magnitude increase in the bandwidth. In addition, new Internet applications increased the demand for improved latency. Adapters were needed to support more users and a larger number of connections to consolidate the external network interfaces. The combination of all of the above requirements presented a unique challenge to prior art server I/O subsystems. With the introduction of the prior art IBM zSeries computer has come an enhanced version of a new I/O architecture for the mainframe called queued direct I/O (QDIO). The architecture was initially exploited for Gigabit and Fast Ethernet adapters. More recently the architecture was exploited by the OSA-Express network adapter for Asynchronous Transfer Mode (ATM) and highspeed Token Ring connections, and it was exploited by so-called "HiperSockets" for internal LPAR-to-LPAR connections. In each of these features, the TCP/IP stack is changed to tightly integrate the new I/O interface and to offload key TCP/IP functions to hardware facilities. For external communications, the offloaded functions are performed by the OSAExpress hardware microcode; for internal communications, the offloaded functions are performed in the zSeries Licensed Internal Code (LIC). The result is a significant improvement in both latency and bandwidth for sockets-based messaging which is transparent to the exploiting applications. For more details, see "zSeries features for optimized sockets-based messaging: HiperSockets and OSA-Express" in IBM J. RES. & DEV. VOL. 46 NO. 4/5 July/September 2002.

In a multiprocessor environment or a logically partitioned computer as described above it is often desirable to move data from one processor to another or from one partition to another one. U.S. Pat. No. 6,854,021 discloses an any-to-any connectivity among discrete partitions or servers within a logically partitioned (LPAR) computer without requiring any physical cabling. Network latency is already quite low because no physical I/O adapter is required to perform the desired data transfer among discrete servers within a computer. Instead, a direct memory copy is performed by the sending central processing unit (CPU) from one server's memory to the memory of the other partition. Since the links among the discrete server are only virtual, no additional cabling or physical configuration is required when logical partitions are configured within the same computer. If this support is hidden under the TCP/IP protocol as an internally implemented cluster local area network (LAN), then applications can gain significant performance enhancements when communication occurs via these virtual links, without any application changes. Security is maintained among the partitions because the CPU I/O instruction is the only point of interception, since an adapter is not used for the communications. Since there is no physical media involved with these virtual links, the maximum bandwidth approaches that of the memory bus of the computer.

In this published patent, data is sent from one partition to a second partition within a logically partitioned computer. In a data processing system having multiple logical partitions, a send queue is established in the first logical partition, and a receive queue is established in the second logical partition. The send queue is registered in the lookup table available to all of the logical partitions. The send queue is registered using as a key the logical partition identification of the first logical partition and the subchannel number (LPAR-ID.SUBCHANNEL#) of the subchannel assigned to the partition. The receive queue is registered in the lookup table using as a key, the internet protocol address of the receive queue in the second partition. A send instruction from the first logical partition is executed which interrogates the lookup table using the LPAR-ID.SUBCHANNEL# key to locate the send queue and IP address key to locate the receive queue, and sends the data in the send queue in the first logical partition to the receive queue in the second logical partition. The entries of the send and receive queues contain arrays of addresses that point to data buffers. The send instruction performs the data copy directly from the sender's buffers to the target's receive buffers. The target partition may then be notified that the data is available in its receive buffers by either a polling model, an interrupt model or a combination of both.

The disadvantage of this prior art data sending between logical partitions, is the overhead of locating and analyzing the send queue and its array of buffer addresses. This will become especially apparent, when the amount of data sent with one instruction is quite low. Normally, the maximum size of one single data buffer is 4 kB, corresponding to one memory page. In cases in which only a single data buffer is moved by a send instruction, the prior art method performs significantly worse.

It is thus an objective of the present invention to provide an improved method for transferring data in a LPAR to LPAR communication with special reference to smaller data packages, in particular corresponding a data amount less than or equal to a memory page, for example 4 kB.

BRIEF SUMMARY

This objective of the invention is achieved by the features stated in enclosed independent claims. Further advantageous arrangements and embodiments of the invention are set forth in the respective subclaims. Reference should now be made to the appended claims.

According to the broadest aspect of the invention a method for performing logical partition (LPAR)-to-LPAR communication in a server based network computing environment is disclosed, wherein read or write requests to different memory areas of a single mainframe memory are controlled by a storage control element, which requests are issued by different multiple operating systems using a general network transfer format e.g. TCP/IP, and wherein a request is sent by a first operating system to said storage control element, where the request is executed with a processor instruction—for example a SIGA instruction, and wherein a result of said request is received by the same or a second operating system, characterized by the step of: sending a modified processor instruction referred to herein as "SIGA-light", to the storage control element which implements an execution of said instruction synchronously performed to the sending of said instruction, without buffering the request of the instruction in a dedicated queue.

This improves the overall latency for the small data transfer significantly in case that data up to a size of 4 kbyte or one memory page are transferred.

Preferably, referring to mainframe computers, the prior art Hipersockets interface on the sender side will be extended by the present invention as a new interface is added by introducing a so-called SIGA—"light" instruction for small data transfers of up to one memory page, which uses certain memory registers. The interface on the receiver side does advantageously not need to be changed. The inventive sender interface is a synchronous interface which is simplified because according to the invention there are no more queues to store a send request before processing the data transfer.

BRIEF DESCRIPTION OF THE SEVERAL VIEWS OF THE DRAWINGS

The present invention is illustrated by way of example and is not limited by the shape of the figures of the drawings in which.

DETAILED DESCRIPTION

Figure 1:
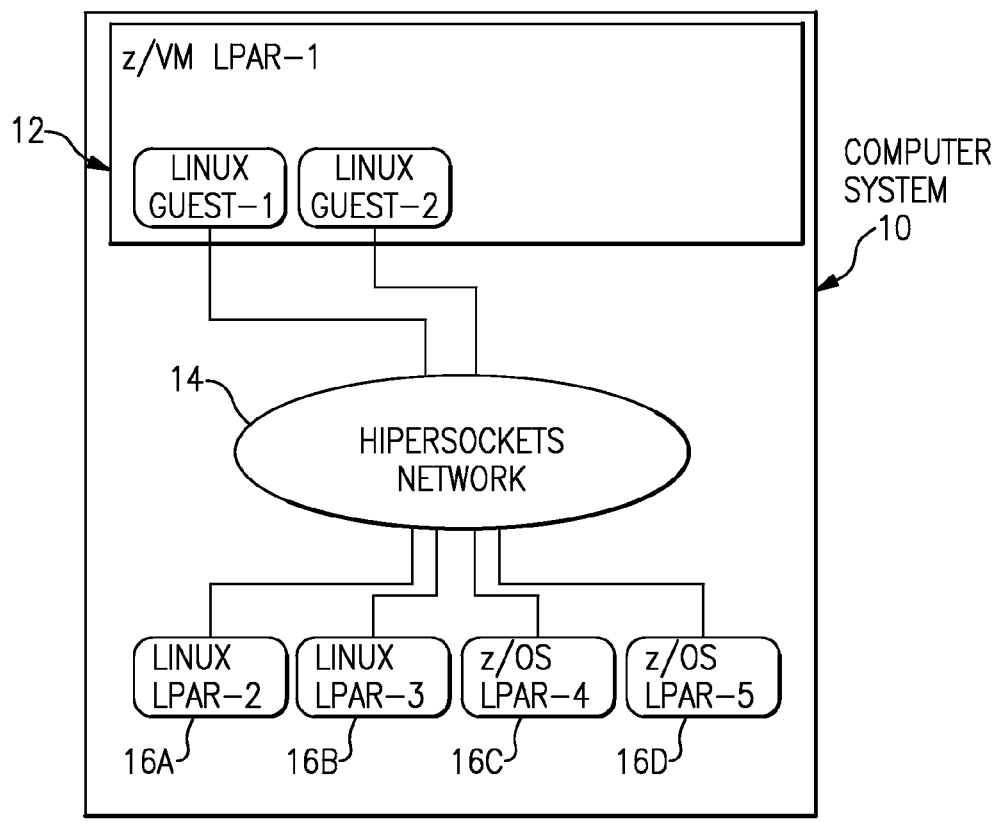
FIG. 1 illustrates the most basic structural components of a prior art hardware and software environment including a particular memory network, e.g., a so-called "HiperSockets network" used for a prior art method.

FIG. 1 shows a prior art system environment in which the inventive method can be performed. Inside a computer system 10, there are multiple logical partitions (LPARs) or virtual servers 16A-D, and 12, in which different operating systems can be installed. These LPARs can have access to a HiperSockets Network 14, which is a virtual LAN. Instead of an operating system another level of virtualization Hipervisor can be installed in an LPAR 12 that hosts second level virtual servers (z/VM guests). These second level guests can also have access to a virtual HiperSockets network.

Figure 2:
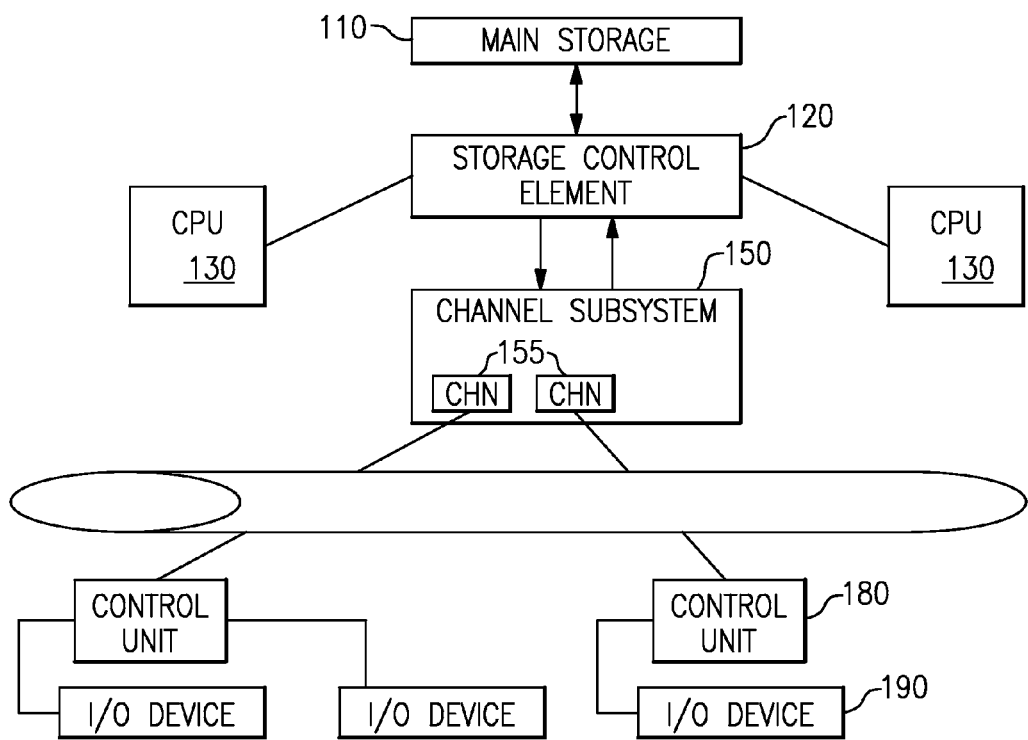
FIG. 2 is a depiction similar to FIG. 1, but focussing the hardware architecture of the system.
Figure 3:
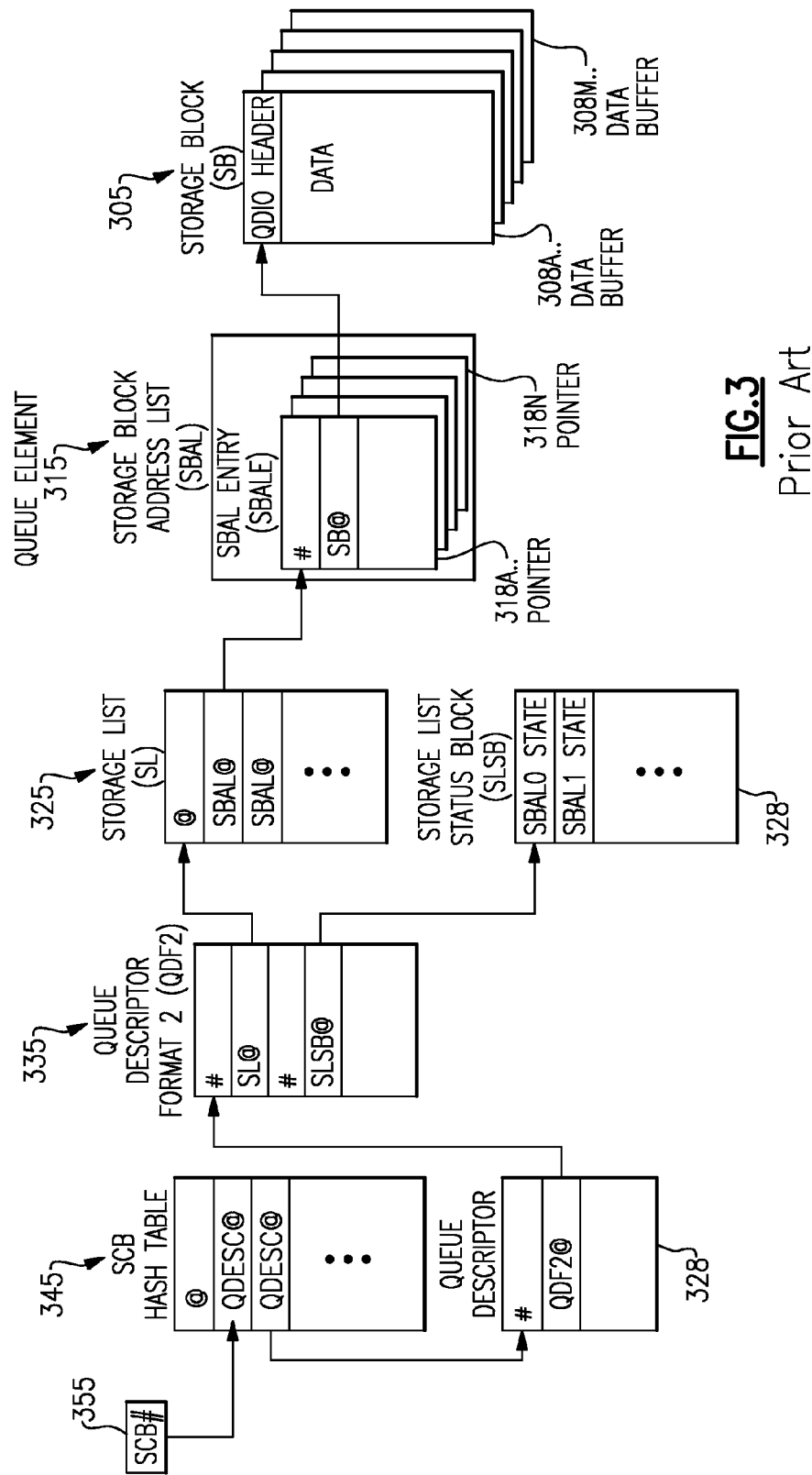
FIG. 3 illustrates the logical queue structure of prior art LPAR-to-LPAR communication.

FIG. 2 shows the hardware aspects of this system environment. The main storage 110 is controlled by a storage control element 120. The CPUs 130 process instructions which read or write data to or from, respectively the main storage 110. The channel subsystem 150 represents a system element which organizes the input/output to respective I/O devices. The channel subsystem 150 uses a plurality of channels 155 in order to communicate with the I/O devices 190. Each I/O device 190 is controlled by a respective control unit 180. In the case of the state of the art HiperSockets technology, Channels 155, Control unit 180 and I/O devices 190 are completely virtualized in Firmware, but managed and configured in the same way as hardware instances.

The inventive method itself is advantageously performed by above mentioned CPUs 130 which perform a processor instruction referred to as "SIGA Light". By this inventive instruction the speed in which data transfers over the main storage 110 can be performed, is significantly increased, while the configuration methods using Channels and I/O devices are maintained.

Next, and with reference to FIGS. 3, 4, 6 and 8, respectively, the inventive method will be described in more detail by means of a typical processor instruction which transfers data from a memory page belonging to one LPAR (in FIG. 1) to a memory page within the main storage 110 (in FIG. 2) belonging to another or the same LPAR.

In a state of the art method software first fills the next applicable queue element 315 of the outbound queue 325 with information about the data to be transferred, in particular with pointers 318A to the data buffers 308A . . . 308M. The first data buffer contains a header section (FIG. 4) that identifies the target of the message. The identifier can be an IP address or MAC address 455. Then software will set the state of the queue element 328 to "primed" and issue an I/O instruction (SIGA).

The parameters of the SIGA instruction identify the subchannel 702 the outbound queue 703 was linked to. The firmware that implements the SIGA (FIG. 5) for HiperSockets verifies—step 510—whether software is authorized to access that subchannel/queue to access that Channel/LAN. If that is the case, it uses—step 520—an internal lookup table to find the corresponding queue structures. Then it finds the next primed slot, step 530—and the corresponding address of the Storage Buffer Address List (SBAL@) to find the address of the first send buffer (FIG. 3), step 540. It then evaluates the QDIO header (FIG. 4), step 550, and uses another internal lookup table to find the target's receive queue, step 560, look for the next empty slot, step 570, and transfer—step 590—the data from the send buffer to the receive buffer, steps 570 and 580, 590. This is repeated for all buffers, send and receive buffer, see loop including step 595, of the send SBAL. Then the status of the slot of the outbound queue and the slot of the inbound queue are updated, steps 596 and 597.

Figure 4:
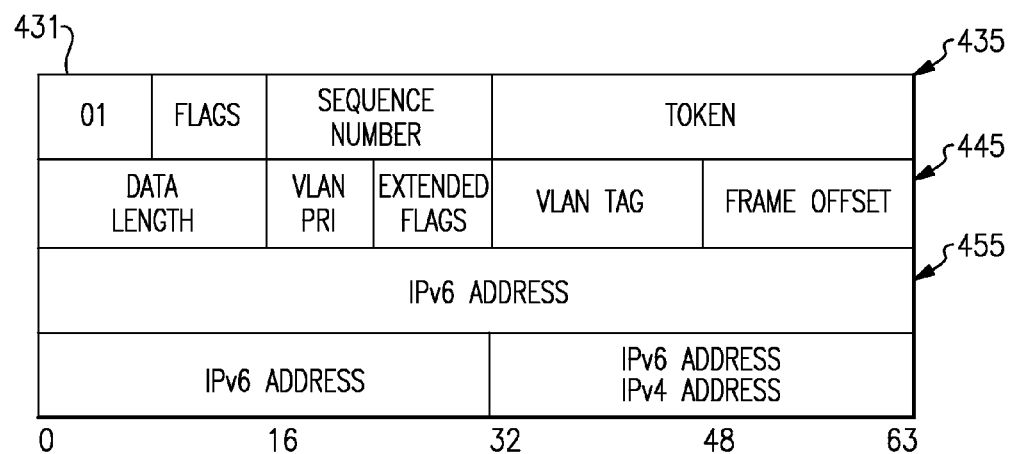
FIG. 4 illustrates the prior art header format that is also used in the preferred embodiment of the inventive method.
Figure 5:
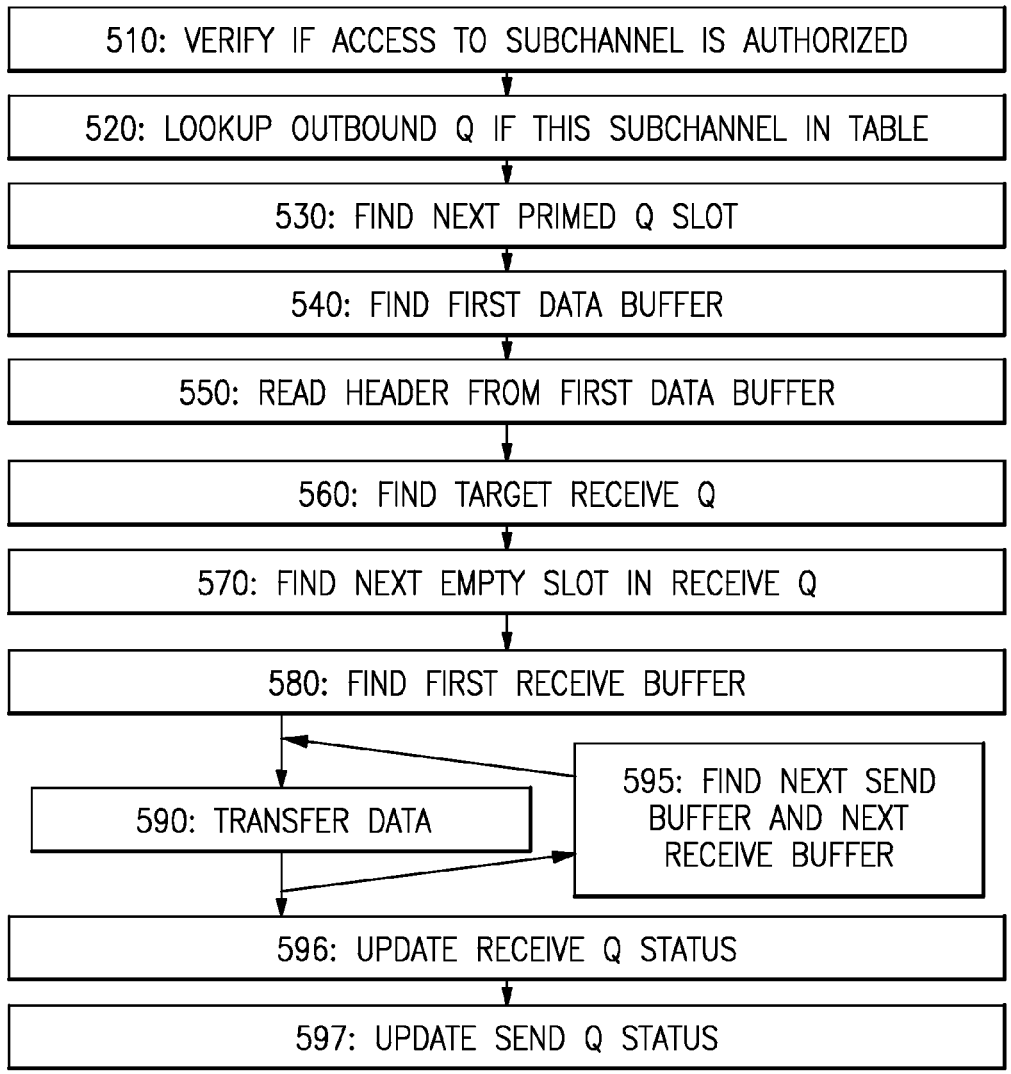
FIG. 5 illustrates the control flow of the most important steps of the state of the art method.
Figure 6:
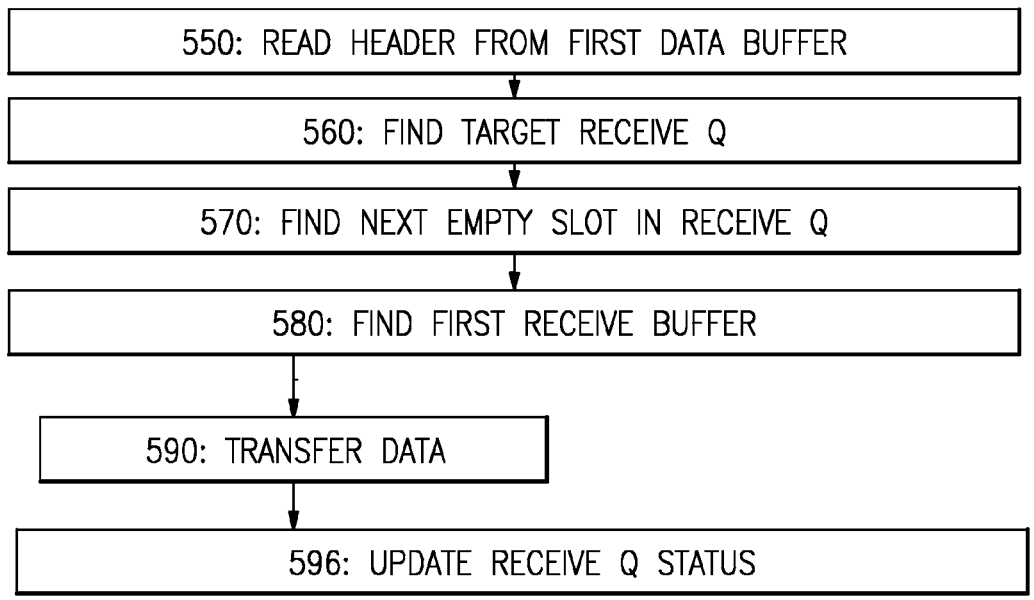
FIG. 6 illustrates the control flow of the most important steps of a preferred embodiment of the inventive method.
Figure 7:
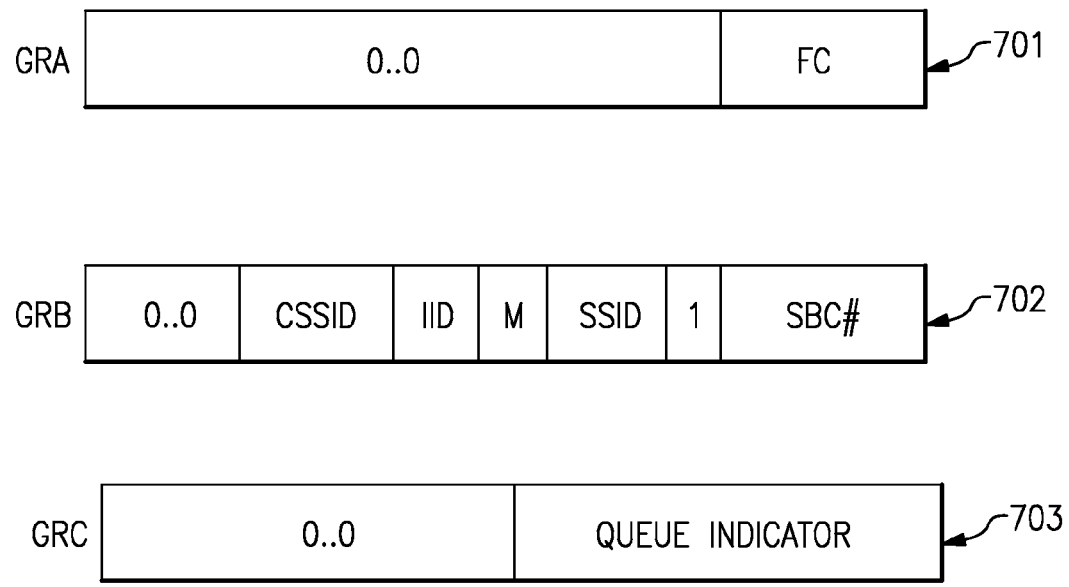
FIG. 7 illustrates the parameter format of the prior art instruction.
Figure 8:
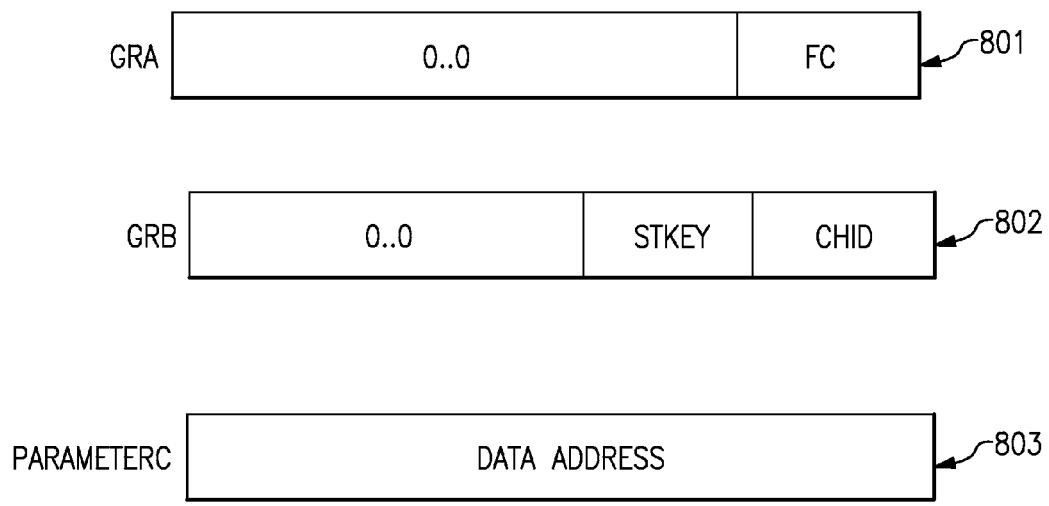
FIG. 8 illustrates the parameter format of the preferred embodiment.

In the inventive method, however, the software does not need to fill a queue element or set a status, instead the address of the data to be transferred 803 is passed as a parameter of the SIGA-light instruction as well as the channel identification 802 of the channel to be used. SIGA-light instruction now uses the channel ID 802 to check for access rights and then uses the data address 803 to directly access the corresponding header (FIG. 4).

The finding of the target's receive queue and data transfer is done as in the state-of-the-art method, except that no looping over multiple buffers is necessary. Finally, no status update of the outbound queue is necessary as no outbound queue was used. The result of the data transfer is directly returned to the software as a condition code of the synchronous SIGA-light instruction, see also the control flow of FIG. 6.

Further, the inventive method can be modified in relation to some aspects as follows:

In addition to communication between logical partitions within a physical server, this invention may also be used to transfer data between multiple virtual servers within a single logical partition or within multiple processes within a single logical partition or within multiple physical servers or combinations of the above, independently of the server platform, be that mainframe like or other.

The invention may be implemented as new instruction or as new function code of an existing instruction.

Instead of passing the address of a single data area as parameter the address of an address list pointing to multiple data areas could be passed as parameter.

Instead of an IP address or a MAC address, other means (like e.g. a token) could be used to identify the target of a message.

Instead of passing the means to identify the target of a message (IP address or MAC address or other) in a header area inside the data buffer, it could be passed as a parameter of the instruction.

If a point-to-point connection is established between source and target, no addressing or header is necessary inside the data area.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The invention claimed is:

1. A method for performing logical partition (LPAR)-to-LPAR communication in a network computing environment, wherein read or write requests to different memory areas of a single computer memory are controlled by a storage control element, which requests are issued by different multiple operating systems using a general network transfer format, and wherein a request is sent by a first operating system to said storage control element, where the request is executed with a processor instruction, and wherein a result of said request is received by the same or a second operating system, the method comprising: sending a modified processor instruction associated with the request to the storage control element which implements an execution of said modified instruction synchronously performed to the sending of said modified instruction, without buffering the request in an outbound queue, the execution comprising sending data associated with the modified instruction to an inbound queue comprising a receive buffer, the inbound queue associated with the same or the second operating system.

2. The method according to claim 1, performed in a logical partition (LPAR)-to-LPAR communication of a mainframe based network, wherein said computer memory is a mainframe computer memory.

3. The method according to claim 1, implemented as a new processing instruction.

4. The method according to claim 1, implemented as a new function code of an existing processing instruction.

5. The method according to claim 1, further comprising: passing the address of a single data area as a parameter.

6. The method according to claim 1, further comprising: passing the address of an address list pointing to multiple data areas as a parameter.

7. An electronic data processing system for performing logical partition (LPAR)-to-LPAR communication in network computing environment, wherein read or write requests to different memory areas of a single computer memory are controlled by a storage control element, which requests are issued by different multiple operating systems using a general network transfer format, and wherein a request is sent by a first operating system to said storage control element, where the request is executed with a processor instruction, and wherein a result of said request is received by the same or a second operating system, the electronic data processing system comprising a server, the server comprising: means for sending a modified processor instruction associated with the request to the storage control element which implements an execution of said modified instruction synchronously performed to the sending of said modified instruction, without buffering the request in an outbound queue, the execution comprising sending data associated with the modified instruction to an inbound queue comprising a receive buffer, the inbound queue associated with the same or the second operating system.

8. The electronic data processing system according to claim 7, wherein said computer memory is a mainframe computer memory.

9. The electronic data processing system according to claim 7, further comprising means for passing the address of a single data area as a parameter.

10. The electronic data processing system according to claim 7, further comprising:
  means for passing the address of an address list pointing to multiple data areas as a parameter.

11. A computer program product for performing logical partition (LPAR)-to-LPAR communication in a network computing environment, wherein read or write requests to different memory areas of a single computer memory are controlled by a storage control element, which requests are issued by different multiple operating systems using a general network transfer format, and wherein a request is sent by a first operating system to said storage control element, where the request is executed with a processor instruction, and wherein a result of said request is received by the same or a second operating system, the computer program product comprising: a non-transitory computer readable storage medium readable by a processing circuit and storing instructions for execution by the processing circuit for performing a method comprising: sending a modified processor instruction associated with the request to the storage control element which implements an execution of said modified instruction synchronously performed to the sending of said modified instruction, without buffering the request in an outbound queue, the execution comprising sending data associated with the modified instruction to an inbound queue comprising a receive buffer, the inbound queue associated with the same or the second operating system.

12. The computer program product according to claim 11, wherein said computer memory is a mainframe computer memory.

13. The computer program product according to claim 11, further comprising:
  passing the address of a single data area as a parameter.

14. The computer program product according to claim 11, further comprising:
  passing the address of an address list pointing to multiple data areas as a parameter.

\* \* \* \* \*